Apr. 24, 1923.

H. J. HOYT 1,452,836

CONVEYER SYSTEM

Filed Aug. 8, 1917

Attest:
S. G. Taylor

Inventor:
Homer J. Hoyt,
by Ernest Hopkinson
his Atty.

Apr. 24, 1923.
H. J. HOYT
1,452,836
CONVEYER SYSTEM
Filed Aug. 8, 1917
3 Sheets-Sheet 2
Fig. 3.
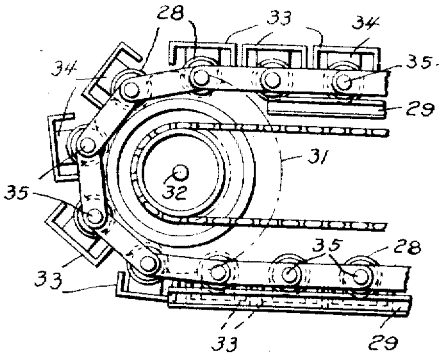
Fig. 4.
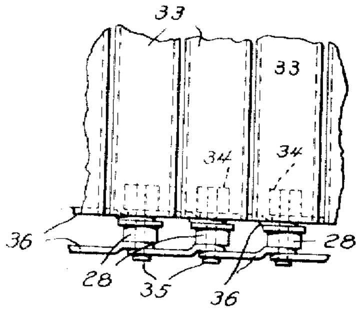
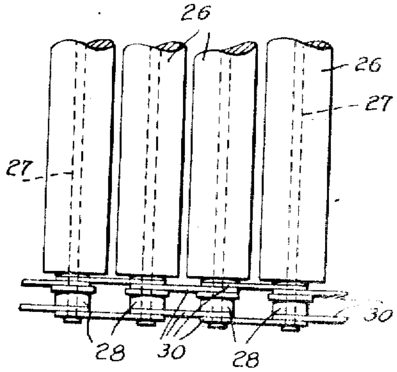
Fig. 5.
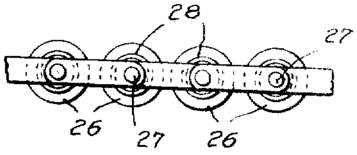
Fig. 6.
Attest:
S. G. Taylor
Inventor:
Homer J. Hoyt,
by Ernest Hopkinson
his Atty.

Apr. 24, 1923.

1,452,836

H. J. HOYT

CONVEYER SYSTEM

Filed Aug. 8, 1917

Inventor:
Homer J. Hoyt,
by Ernest Hopkinson
his Atty.

Patented Apr. 24, 1923. 1,452,836

UNITED STATES PATENT OFFICE.

HOMER J. HOYT, OF DETROIT, MICHIGAN, ASSIGNOR TO MORGAN & WRIGHT, A CORPORATION OF MICHIGAN.

CONVEYER SYSTEM.

Application filed August 3, 1917. Serial No. 185,027.

*To all whom it may concern:*

Be it known that I, HOMER J. HOYT, a citizen of the United States, residing at Detroit, county of Wayne, and State of Michigan, have invented certain new and useful Improvements in Conveyer Systems, of which the following is a full, clear, and exact description.

This invention relates to an apparatus for systematizing and facilitating the manipulation of molds incident to curing rubber goods in general. In the curing of tires, as a particular example of such rubber goods, the weight of the molds and tires and cores is such that operatives are unduly taxed in the manipulation and transport thereof in the press room. Also excessive floor space has been taken up by the old methods or systems employed in the press room. Further, the work of the operatives has been general rather than specialized, with a resultant slowing down in production per man employed. Still further, the loading of the presses has been more or less difficult.

The present invention aims to provide an apparatus insuring systematic handling of the molds, reducing manual labor materially expediting the refilling of the molds and their loading into the vulcanizers, shortening the interval between the discharge of the molds from, and their recharge into, vulcanizers, and enabling the operatives to become expert in special operations allotted to them. Generally, it aims to economize in labor, cost of production and factory space. Still further, it aims to provide a flexible system for transporting the molds to and from the vulcanizers at a rate of speed that can be controlled and permitting, preferably but not necessarily, the molds to be temporarily halted while emptied and refilled.

With the illustrated embodiment of the invention in mind and without intention to unnecessarily limit its scope, the invention may be said to consist in a conveyer system having a row or rows of vulcanizers flanked on opposite sides by supply and discharge conveyer flights or runs for delivering molds loaded with uncured articles to the presses and for carrying away the molds containing the articles after they have been cured, the said supply and discharge conveyer flights being operatively connected up by a conveying run or any interconnecting means of transport for circulating the molds in a prescribed path permitting access to them for emptying and refilling operations. More briefly and particularly described, the preferred construction embodies a shunt arrangement of a plurality of vulcanizers between parallel lapping runs of a conveyer that is substantially continuous.

In the drawings:

Fig. 1 is a plan view, illustrating an embodiment of the invention;

Fig. 1ª is an elevation illustrating conventionally a form of cover-lifting device or traveling hoist suitable for separating the sections of the molds.

Figs. 3 and 4 are detail views, illustrating one type of conveyer;

Figs. 5 and 6 are detail views, illustrating another type of conveyer.

Figures 1, 1A, 2:
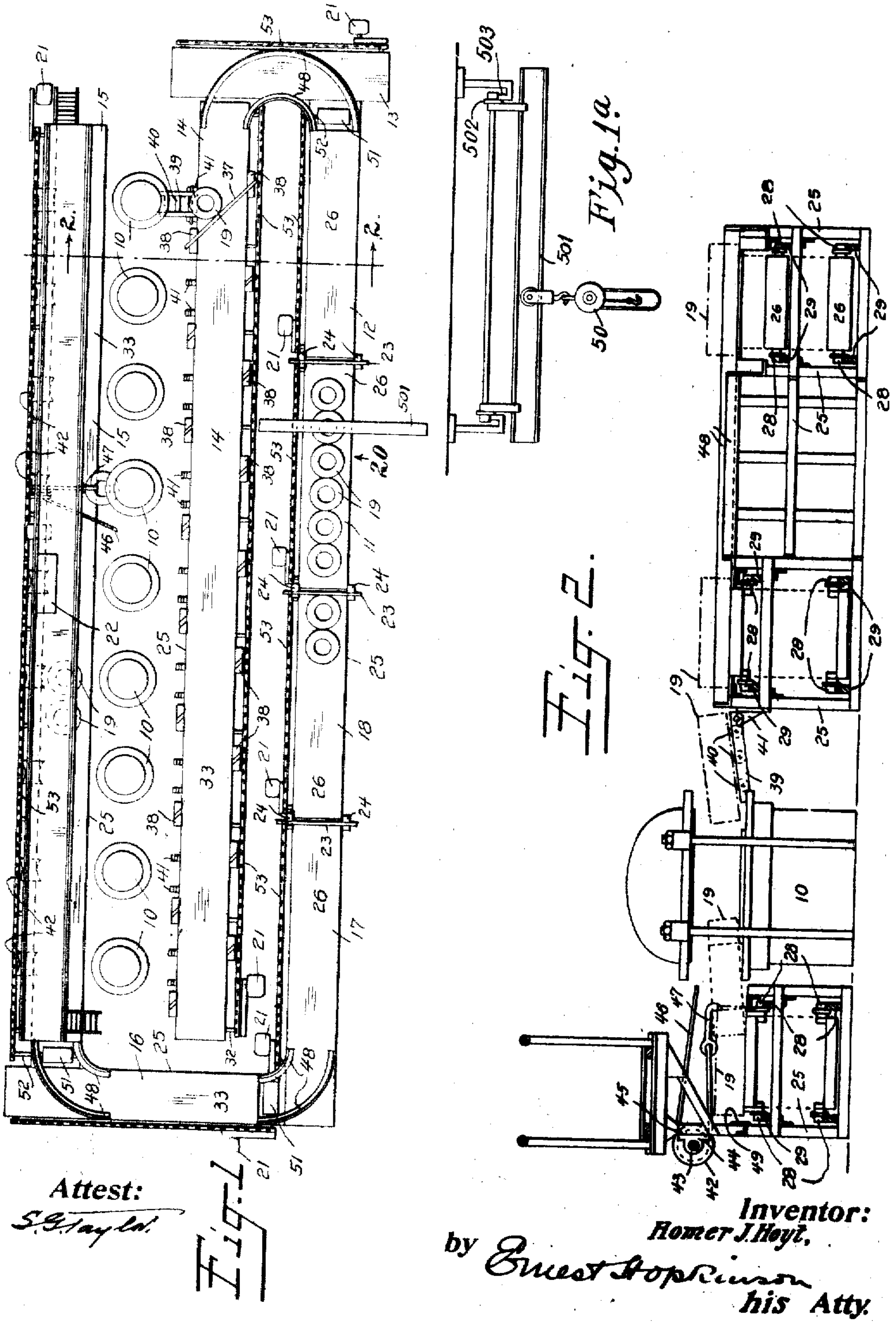
Fig. 2 is a cross-section on line 2—2, Fig. 1.

Referring to the drawings, 10 indicates a series of presses for vulcanizing rubber articles. The type or number of these presses may be varied as desired, and their arrangement may be modified to suit conditions encountered in practice. The usual French press for curing tires is illustrated conventionally and a number of these are shown arranged in a straight row, but, obviously, the vulcanizers may be variously disposed or arranged to suit the available space. A movable tread platform, which in the system shown is in the form of a series of endless conveyers 11, 12, 13, 14, 15, 16, 17 and 18, serves to carry the molds 19 from the collecting and supplying station 20 to any desired press 10, and to return them to said station after the vulcanizing process has been completed. Each of the conveyers is driven by an individual electric motor 21, independently controlled from a central station 22. This arrangement enables the operator to regulate the time and rate of travel of any of the respective conveyers as desired, thereby governing the time and rate of delivery of the molds to the presses and their return to the station 20.

An additional means is also provided for regulating the time and rate of return of the molds to the station 20. Although capable of various constructions this is shown in the form of stop-bars 23 one of which is arranged at the end of each of the conveyers 17 and 18. These bars are adapted to be let down into suitable brackets 24 attached to the conveyer frame 25, and when in position extend transversely across the conveyers. By this means the molds which normally leave the presses spaced apart may be accumulated so as to lie edge to edge for delivering to the station, thereby effecting a substantial economy in space and greatly facilitating the loading and unloading operations.

The conveyers 17 and 18 on which the stop-bars are used are provided with roller treads to adapt them to rotate freely when the molds are blocked thereon. As shown in Figs. 5 and 6 this type of conveyer comprises a series of rollers 26 mounted to revolve freely on axles 27 of the flanged wheels 28 adapted to run on the track 29 carried by the frame 25. Adjacent rollers are connected together by means of suitable links 30. Sprocket wheels 31 mounted on shafts 32, driven by motors 21 serve to drive the conveyers. An important advantage of this type of conveyer lies in the fact that it is not necessary for the operator to shut off the power when the molds are blocked thereon as the rollers 26 are free to turn in a reverse direction to that of their axles. Conveyer 11 is also made of the roller type to facilitate the transfer of the molds at varying rates of speed and a stop-bar 23 may be located at the delivery end of conveyer 11 when desired.

The conveyers 12 to 16 inclusive, are comprised of a series of U-shaped carriages 33, each carriage being provided on its underside with bearing blocks 34 formed to receive axles 35 of the flanged wheels 28 adapted to run on the tracks 29. Adjacent carriages are connected together by means of suitable links 36. The driving mechanism shown in Fig. 3 is employed for both types of conveyers.

When it is desired to fill a press, a shunt-bar 37 is set in place in brackets 38 arranged on opposite sides of the conveyor frame at a point adjacent the press. This bar extends diagonally across the movable platform and serves to deflect the molds from the platform to the runway 39, down which they slide by help of the force of gravity into the press. The runway is portable and is provided with suitable rollers 40. It is secured in place in the brackets 41 carried by the conveyer frame.

Located on the delivery side of each press is a friction winch 42 mounted on the line shaft 43 driven from a source of power, not shown. The shaft is supported in bearings 44 attached to the suspended platform frame 45. When it is desired to remove the molds from the press, a rope 46 having a hook 47 at one end is wound around the winch 42. The hook is then secured to the mold and the operator by exerting a pull on the free end of the rope, causes the mold to be quickly transferred to the return conveyer 15.

Curved guide rails 48 attached to the frame 25 are provided for guiding the molds on and off the conveyers 13 and 16. A guide rail 49 attached to the frame 25, serves to prevent the molds from sliding off the return conveyer 15.

The conveyers 11, 15, 16, 17 and 18 are arranged at a sufficiently low level to facilitate loading and unloading the molds while the conveyers 13 and 14 are arranged at a higher level to provide a gravity feed for the molds down the runway 39 to the presses. The conveyer 12 is arranged with a rise leading from the level of the lower conveyers to that of the upper.

Chain hoists 50 are provided for loading and unloading the molds, these being illustrated conventionally in Fig. 1ª and shown supported overhead from I-beams 501 movable bodily sidewise by means of rollers 502 which track on rails 503 suspended from the ceiling and extending lengthwise above the conveyer sections, as clearly shown in the drawings, in order to permit, when desired, replacing the cover section on the bottom section of the mold without halting movement of the latter. But, obviously, any suitable means may be employed above the conveyer for lifting the cover sections of the molds and replacing them on the lower sections whether the latter be moved continuously or halted temporarily, as, for instance, when a stop-bar 23 is interposed in their path of travel while resting on the conveyer sections 17, 18 and 11, respectively.

Space-bridging rollers 51 are introduced between the conveyer 16 and each of the adjacent conveyers 15 and 17, and between the conveyers 13 and the adjacent conveyers 12 and 14. Each of these rollers is mounted on an axle 52 secured in suitable bearings attached to the frame 25, and is driven from the motor 21 by means of chain drive 53.

Figure 7:
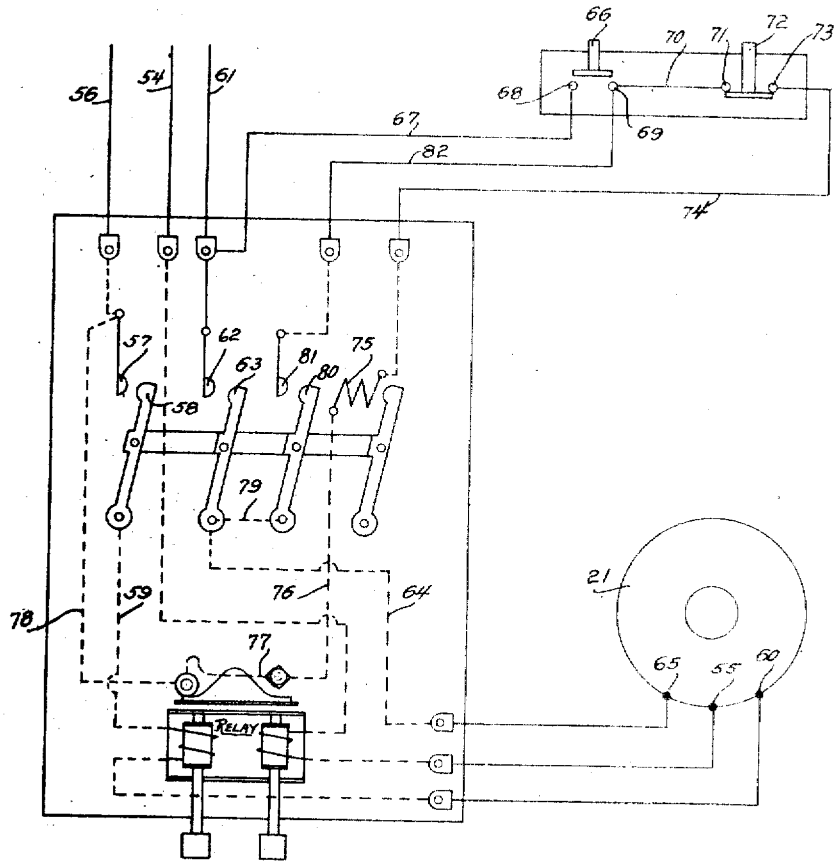
Fig. 7 is a diagrammatic view showing the individual control of a motor from the central switch board.

In Fig. 7 a diagrammatic view is shown of a suitable system for independently controlling each motor from a central switch board. An alternating current motor is used, and is controlled in the following manner: The first lead wire 54 runs direct from the source of supply through the right hand coil of the overload relay and thence to the motor 21 at 55. The second wire 56 leads through the switch contact points 57 and 58, the wire 59, the lefthand coil of the overload relay and to the motor at 60. The third wire 61 leads through the switch contact points 62 and 63 and the wire 64 to the motor at 65. The switch contact points are normally open, and to close them and start the motor the push button 66 is momentarily pressed down. Thereupon current passes from the wire 61 through the wire 67, contact 68, button 66, contact 69, wire 70, contact 71, stop button 72, contact 73, wire 74, solenoid 75, wire 76, circuit-breaker 77, and wire 78 to the wire 56. The solenoid 75 when energized closes the switch to allow the current to flow across the contact points 57, 58 and 62, 63, thereby starting the motor. Actuation of the switch also closes the contacts 80 and 81, and upon release of the starting button 66 the current for the solenoid 75 will then pass from the switch contact 63 through the wire 79, switch contacts 80 and 81, and wire 82 to the contact 69 and thence to the wire 56 as before. The overload relay operates in the ordinary manner to break the circuit through the solenoid 75 at 77 when an overload occurs. This allows the switch to open thereby breaking the current through the motor. The specific manner in which each motor is independently controlled forms no part of my invention and any other suitable mechanism for this purpose may be used.

The operation of the system hereinbefore described is as follows:

It being understood that the conveyers are continuously moving, the shunt-bar 37 and runway 39 are first set in place adjacent the press it is desired to load. The molds 19 are then filled at the station 20, from whence they pass along the movable platform to a point opposite the press. Here the shunt-bar 37 forces them off the movable platform onto the runway 39, down which they move under the force of gravity into the press 10. The press is operated in the usual manner after loading it and when filled is closed and the vulcanizing process applied. After vulcanization has been accomplished the molds are removed from the press to the return conveyor 15 by means of the winch 42. From the conveyer 15 they pass around the platform to the station 20, whence they started. The molds are then unloaded, for instance in the case of the manufacture of pneumatic tires the mold is opened by raising the upper half with the aid of the hoist 50 and the core with the tire vulcanized thereon is raised in a similar manner. The mold is then ready to receive a new tire and to be sent through the same cycle of operations. In the event that the molds are returned to the station 20 faster than they are required for use, the stop-bars 23 may be set in place to block their passage along the movable platform, thus causing the molds to accumulate on the continuously moving conveyers 17 and 18 until the conveyer 11 is ready to receive them.

In the preferred operation of the apparatus the molds will be temporarily halted on the section 11 either by placing a stop-bar 23 in their path when they will accumulate, as shown, or by cutting off the motor controlling the operation of section 11. But, if desired, the molds may be moved continuously and their cover sections lifted and replaced without stopping the movement of their lower sections, the overhead shiftable hoists permitting this to be done while the cured tires are removed and uncured tires positioned in the lower mold sections which may be resting on any one of the conveyer sections beneath the shiftable hoists 50.

When used in conjunction with the well-known French press type of vulcanizer having a fixed (or relatively fixed) head and a lower hydraulically movable platen, the latter may be dropped continuously and at a rate permitting the molds to be shunted successively from the conveyer and stacked. Obviously, this permits a substantially automatic loading of the presses with an attendant saving in labor and time.

It will be noticed from a scrutiny of Fig. 1 of the drawings that conveyer sections 14 and 15 are arranged at opposite sides of and adjacent the row of mold-treating stations 10, and that these conveyer sections constitute supply and discharge runs for molds entering or leaving the stations or presses 10. These two conveyer sections or runs 14 and 15 being interconnected by sections 16, 17, 18, 11, 12 and 13, of the conveyer enable the heavy molds to be circulated in a pre-determined path from any one of the presses in a row around the system and back again into any one of the vulcanizing presses 10 in the row thereof. Thus, at the same time, two different presses may be emptied and refilled without any possibility of the molds interfering with each other. Thereby, the operation at the mouth of the presses is systematized and the idle period of the presses reduced to a minimum for, of course, in practical operation in a factory, the system is worked out so that a batch of molds containing green or uncured tires are ready for delivery into any one of the presses at the moment it is emptied. On the conveyer sections 17, 18 and 11, the molds may be readily emptied of their vulcanized tires and refilled with unvulcanized or green tires without necessarily lifting the lower mold-sections. Other advantages of the present system will be apparent to those skilled in the art.

While I have described one of the preferred embodiments of my invention, it is obvious that considerable modification and substitution of equivalent devices or elements may be made, without departing from the spirit and scope of the invention as defined in the appended claims.

Having thus described my invention, what I claim as new and desire to protect by Letters Patent is:

1. In a system of the class described, a row of mold treating stations, and a mold conveyer having spaced runs arranged adjacent the row of stations, and a third run connecting the spaced runs whereby separate stations may be simultaneously charged with or discharged of a plurality of molds independently and without interference.

2. In a system of the class described, a row of mold treating stations, a plurality of sectional molds, a mold conveyer having spaced runs arranged at opposite sides of the row of stations, a run continuous with the spaced runs, and means for separating and reuniting molds on the last mentioned run during treatment of the other molds at the stations whereby any station may be supplied quickly after being emptied.

3. In a system of the class described adapted to handle tire curing molds having upper and lower sections, a row of curing stations, and a conveyer arranged abreast of and adjacent to the row of stations for transport of molds to and from any one of them, said conveyer having a continuous accessible portion or run for permitting the molds to be treated and recharged without necessarily lifting their lower sections whereby a batch of molds may be expeditiously transported from any station in the row, emptied, cleaned, refilled and transported to any station in the row while in transit and any empty station immediately recharged.

4. In a system of the class described for handling tire curing molds with upper and lower sections, a row of stationary vulcanizers, and a conveyer arranged to transport molds to and from opposite sides of a row of vulcanizers, said conveyer having a continuous horizontal accessible portion spaced from the vulcanizers for permitting the molds to be treated and recharged, and means located above the accessible portion for lifting upper sections from lower sections of the molds whereby the latter may be emptied, cleaned, and refilled without lifting their lower sections.

5. The combination with a station, of a continuous conveyer system for advancing sectional molds, said system having a portion leading from said station and a portion leading to said station, means for separating said sectional molds in transit, and means for transferring said molds to said station from said last-mentioned portion of the conveyer system and to said first mentioned portion of the conveyer system from said station.

6. The combination with a station for a plurality of sectional molds, of a continuously moving endless conveyer system leading from and returning to said station, means for transferring the molds to said station from said system and from said station to said system and means for separating and reuniting the successive molds.

7. The combination with a station, of an endless conveyer system having a portion for automatically advancing articles to a position adjacent to said station and a second portion for carrying said articles from said station, and to said first-mentioned portion and a deflector for automatically transferring said articles from said first-mentioned portion of the system to said station.

8. The combination with a stationary mold treating means, of a continuously operating conveyer system leading from and returning to a station point, a series of sectional molds adapted to be transferred to and from said conveyer at said station point, and means operating without regard to the positioning of said molds on said conveyer for separating and reuniting the sections thereof to permit of emptying and refilling.

9. Apparatus of the class described, including a row of mold treating stations, a continuous conveyer system having loading and unloading runs on opposite sides of the row of mold treating stations, and a loop interconnecting the loading and unloading runs, said loading run being arranged at an elevation above the mouths of the treating stations for facilitating transfer of molds to the stations.

10. Apparatus of the class described, including a row of mold treating stations, a continuous conveyer system having loading and unloading runs on opposite sides of the row of mold treating stations, a third run continuous with the loading and unloading runs, and means for shifting molds from the loading run of the conveyer into any one of the treating stations without interrupting the movement of the conveyer.

11. Apparatus of the class described, including a row of mold treating stations, a continuous conveyer system having loading and unloading runs on opposite sides of the row of mold treating stations, a third run continuous with the loading and unloading runs, said loading run being arranged at an elevation above the mouths of the treating stations, and means shiftable lengthwise of the loading run for automatically shunting molds therefrom to a treating station without interrupting movement of said loading run.

12. An apparatus of the class described including a series of mold treating stations, a plurality of sectional molds, a continuous conveyer system adjacent and parallel to said series of stations, means for transferring filled molds from the conveyer system to the stations and from the stations to the conveyer system, and means for separating and reuniting the sectional molds, whereby the time intervals between treatments of molds at the stations may be reduced.

13. The combination with a stationary mold-treating means, of a continuously moving conveyer system leading from and returning to a station point, a series of sectional molds adapted to be transferred to and from said conveyer at said station point, and means operating on said molds in transit for separating and reuniting the sections thereof to permit of emptying and filling.

14. [illegible] rubber tires [illegible] including in combination, a row of [illegible] vulcanizing presses having [illegible] platens for clamping [illegible] therebetween, a conveyer [illegible] molds containing [illegible] adjacent each vulcanizer in the row [illegible] with the conveyer [illegible] successively and automatically transferring any desired number of molds from the conveyer into any one of said vulcanizers and stacking them therein, while one of its platens is being lowered.

15. In apparatus of the character described, a row of vulcanizing presses, a collecting and supplying station, means for transferring molds to and fro between said station and said vulcanizing presses, said means comprising a series of endless conveyers in end to end relation arranged to extend from said station to one side of said row of presses and from the opposite side thereof back to said station, and means for independently controlling the conveyers.

16. In combination a row of vulcanizing presses, a supplying and collecting station, and a movable [illegible] platform adapted to transport molds to and fro between said station and presses, said platform extending along and substantially parallel with the discharge side of said row of presses, thence at right angles in a direction leading [illegible] away from said presses, thence at right angles in a direction parallel with said presses and leading through said station, thence at right angles in a direction leading toward said presses, thence at right angles in a direction parallel with and leading along the [illegible] side of said row of presses.

17. In a [illegible] of the character described, a plurality of vulcanizing presses, a station for filling and emptying molds, and means for transporting molds to and fro between said station and said presses, said means comprising a plurality of conveyers [illegible] to extend [illegible] one side of said presses [illegible] the opposite side of said presses [illegible] at least one of said conveyers being provided with a tread composed of rotatable units [illegible] for holding [illegible] molds [illegible] and [illegible] desired.

18. In a system of the character described, a plurality of vulcanizing presses, a station for filling and emptying molds, means for transporting molds to and fro between said station and said presses, said means comprising a plurality of conveyers arranged to extend from said station to one side of said presses and from the opposite side of said presses back to said station, at least one of said conveyers being provided with a tread composed of rotatable units, means for driving said conveyers, and means independent of said driving means operable to stop the passage of the molds along said conveyers.

19. In a conveyer system, a conveyer having parallel high and low level discharge and receiving end portions, respectively, a row of vulcanizing presses disposed between said end portions, a movable inclined connection adapted to be interposed between any desired press and the discharge end portion of the conveyer, movable chuting means coacting with the conveyer to direct molds to the connection, means for transferring the molds from the presses to the receiving end portion of the conveyer, and a mold filling and emptying station at an intermediate point on the conveyer.

20. In a conveyer system, a conveyer composed of independently driven sections, said conveyer having discharge and receiving end portions in proximity to each other, a series of vulcanizing presses disposed between said end portions whereby molds may be transferred from the discharge end portion directly to the presses and thence to the receiving end portion, a mold emptying and filling station at an intermediate point on the conveyer, and central means for independently controlling the speed of the conveyer sections, whereby the delivery of the molds to and from the filling station may be regulated to requirements.

21. In combination, a series of vulcanizers, and a mold conveyer of the movable [illegible] type having an intermediate portion passing through a loading and unloading station and two runs each passing [illegible] of the series of vulcanizers one of [illegible] to receive the [illegible] from the respective vulcanizers and the other [illegible] being positioned to [illegible] said vulcanizers.

22. In combination, a series of vulcanizers, and a mold conveyer of the movable platform type having a portion running abreast of the series of vulcanizers on one [illegible] of the vulcanizers [illegible] and [illegible] running abreast of [illegible] said [illegible] the opposite side thereof [illegible] of the vulcanizers may be charged with molds therefrom, and extending from one portion to the other portion past a station where the said conveyer is loaded with the unvulcanized casings and the vulcanized casings are unloaded therefrom, whereby the transportation of the molds in an endless route leading past the said station and through the respective vulcanizers is facilitated, means for stopping the molds at said station, and means for raising and lowering the upper section of said molds to permit removal of their contents.

23. In an apparatus of the character described, means whereby molds may be circulated in an endless run, a vulcanizing press being included in said run, means for independently controlling the movement of the molds at different points in the run, and means disposed adjacent the run for removing portions of the molds to allow emptying and refilling of the portions remaining on the run.

Signed at Detroit, county of Wayne, and State of Michigan, this 6th day of August, 1917.

HOMER J. HOYT.